June 14, 1966  A. C. SANFORD  3,255,943
APPARATUS FOR FABRICATING WOODEN STRUCTURES
Filed April 2, 1964  7 Sheets-Sheet 1
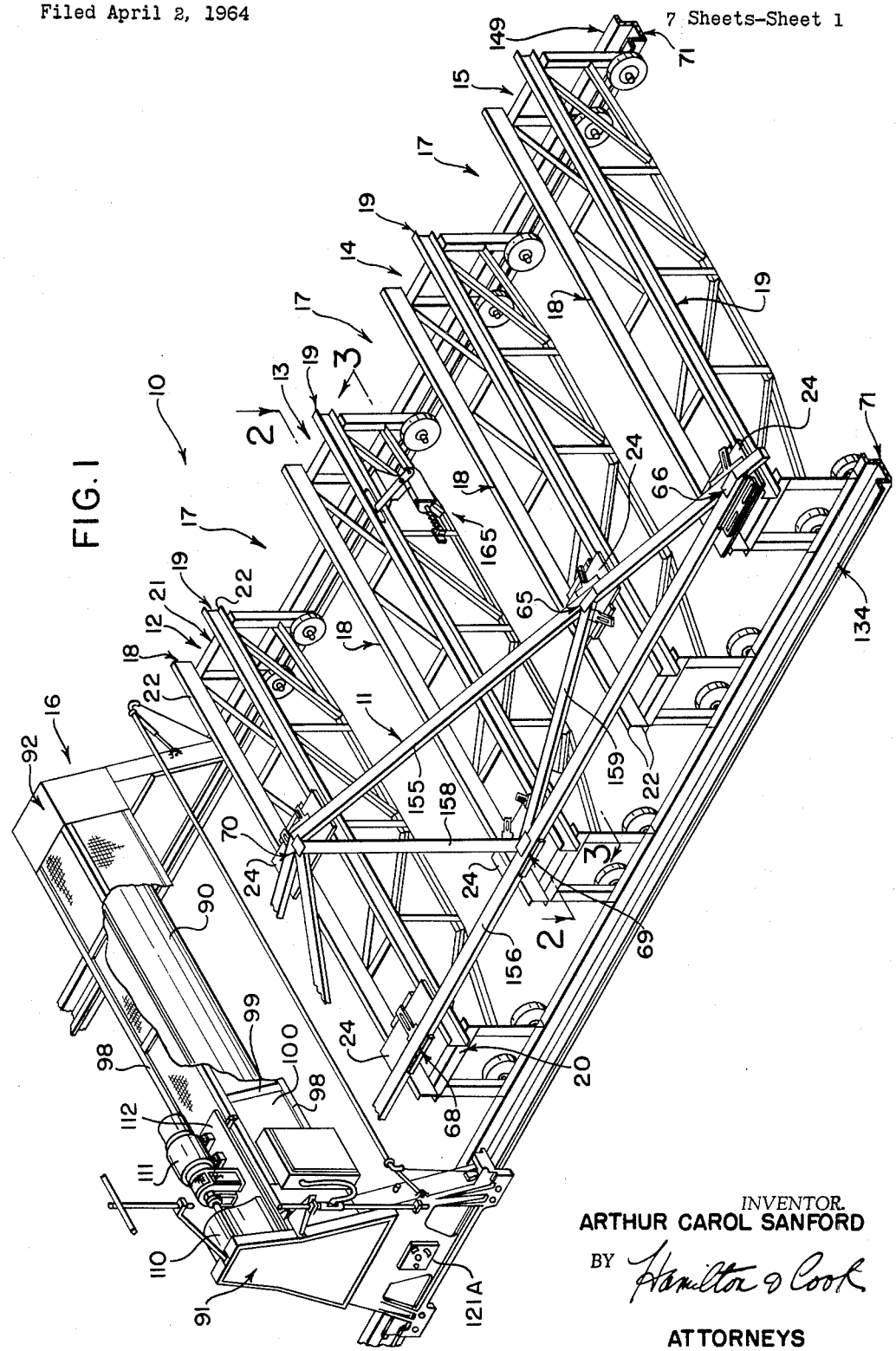
INVENTOR.
ARTHUR CAROL SANFORD
BY Hamilton & Cook
ATTORNEYS

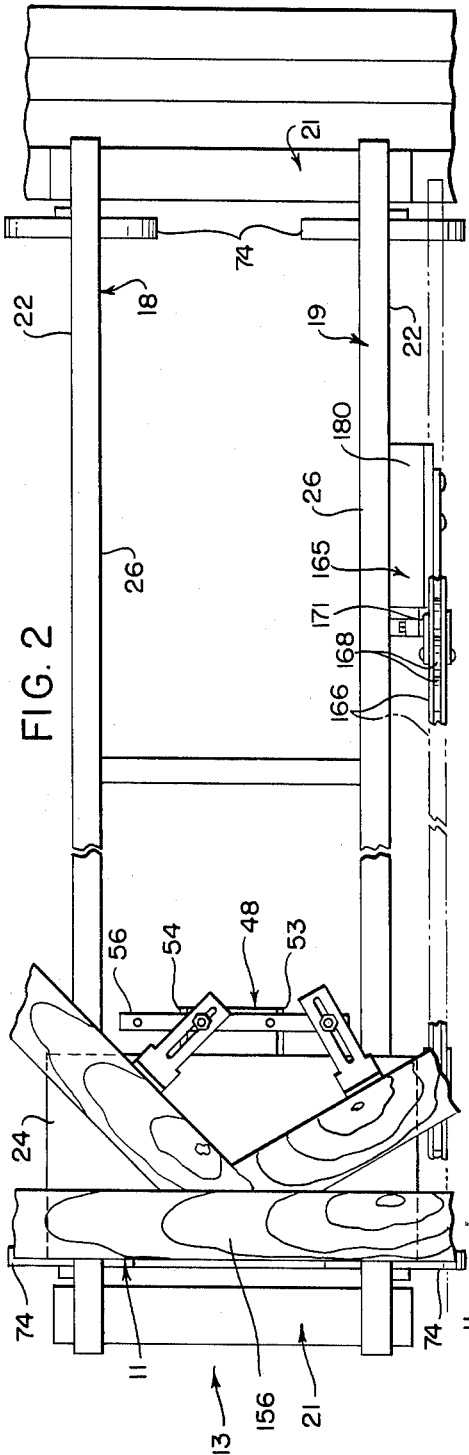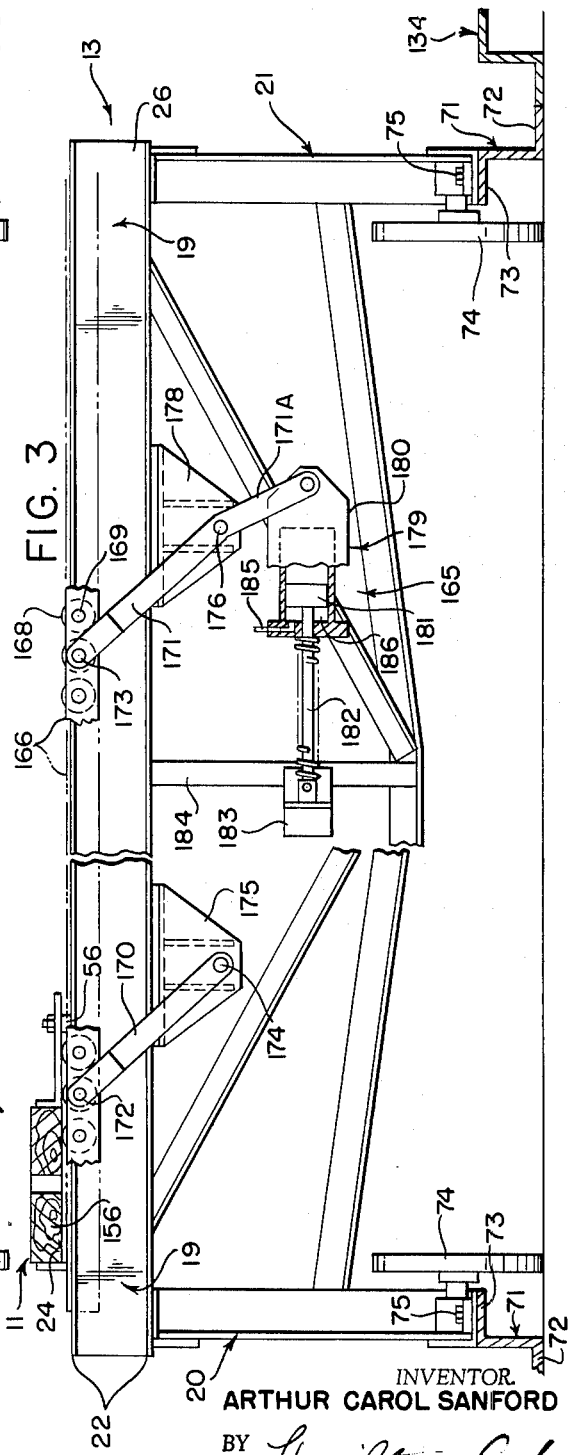

June 14, 1966 A. C. SANFORD 3,255,943
APPARATUS FOR FABRICATING WOODEN STRUCTURES
Filed April 2, 1964 7 Sheets-Sheet 3

INVENTOR.
ARTHUR CAROL SANFORD
BY Hamilton & Cook
ATTORNEYS

INVENTOR.
ARTHUR CAROL SANFORD

June 14, 1966  A. C. SANFORD  3,255,943
APPARATUS FOR FABRICATING WOODEN STRUCTURES
Filed April 2, 1964  7 Sheets-Sheet 5
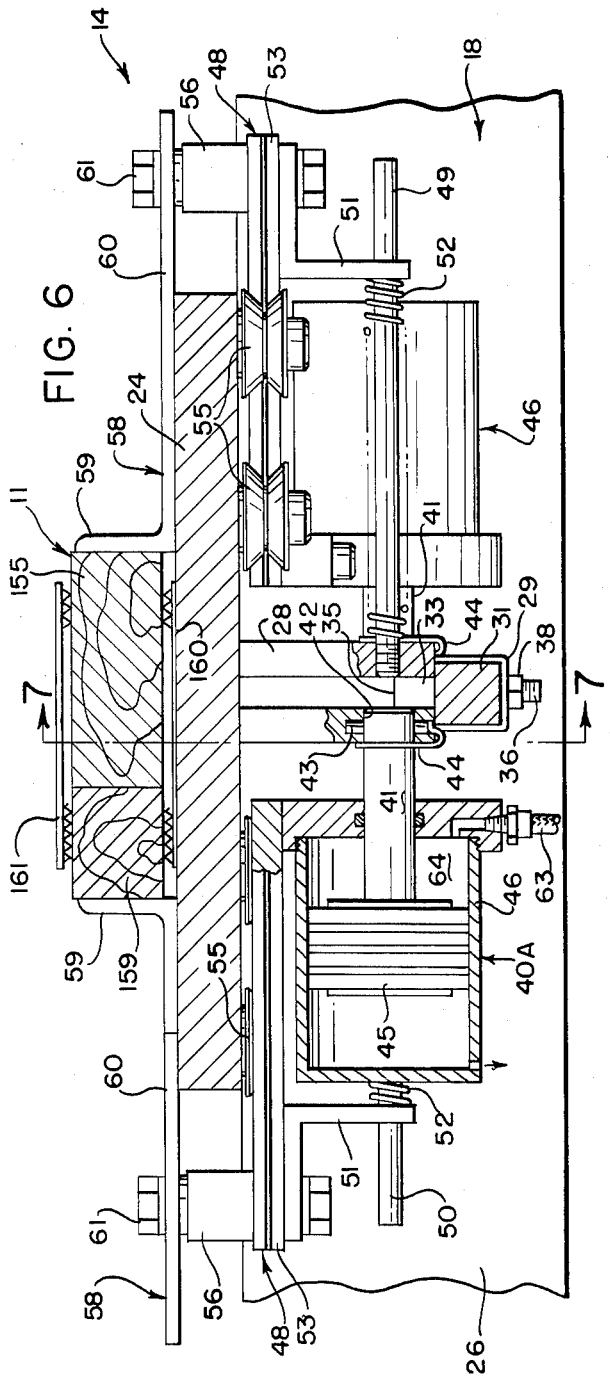
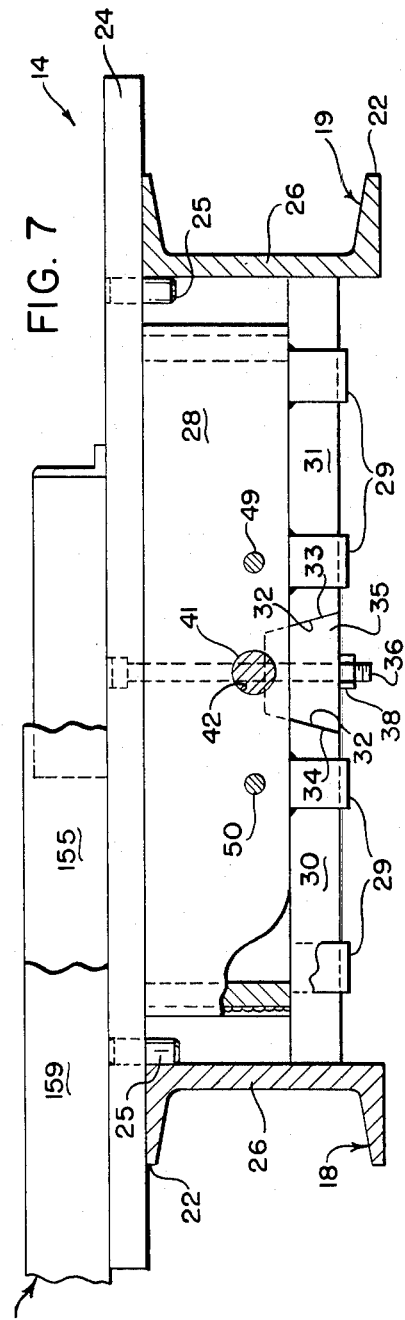
INVENTOR.
ARTHUR CAROL SANFORD
BY Hamilton & Cook
ATTORNEYS June 14, 1966  A. C. SANFORD  3,255,943

APPARATUS FOR FABRICATING WOODEN STRUCTURES

Filed April 2, 1964  7 Sheets-Sheet 7

INVENTOR.
ARTHUR CAROL SANFORD
BY Hamilton D Cook

ATTORNEYS

_United States Patent Office_

3,255,943
Patented June 14, 1966

3,255,943
APPARATUS FOR FABRICATING WOODEN STRUCTURES
Arthur Carol Sanford, Fort Lauderdale, Fla., assignor to Sanford Industries, Inc., Pompano Beach, Fla., a corporation of Florida
Filed Apr. 2, 1964, Ser. No. 356,778
8 Claims. (Cl. 227—152)

The present invention relates generally to the fabrication of wooden structures composed of several parts. More particularly, the present invention relates to an apparatus for joining wooden structural members together. Specifically, the present invention relates to an apparatus for fabricating wooden structures by the use of metallic connector plates.

The present invention is a continuation-in-part of my previously filed copending application Serial No. 239,986, filed November 26, 1962.

The development of improved connector plates has provided a means for prefabricating light-weight and inexpensive trusses and other structural assemblies from dimensional lumber. The connector plates themselves are approximately 20–24 gauge metal, from which are punched a multiplicity of closely spaced pointed projections. These projections preferably extend outwardly from only one face of the plate, but may extend outwardly from both faces. When the projections, or teeth, extend outwardly from only one face the plate is an "exterior" plate and is especially suited for connecting butted joints. When the teeth extend outwardly from both faces the plate is a "sandwich" plate and is especially suited for connecting lapped joints. The concept of the present invention is equally applicable for fabricating structures with lapped as well as butt joints, but will only be described in detail in conjunction with the fabrication of butt joint trusses, as that will impart a complete understanding of the concept of the present invention.

Exterior connector plates are applied to the sides of joints between the various members of the structure and the teeth forced into the wood. The load stress at each joint is thusly distributed over a relatively large area, i.e., the area of the connector plate. Moreover, the teeth are spaced sufficiently apart and so shaped as to be inserted as much interfibrously as possible with very little fiber destruction. When used in the construction of, for example, a truss, this increased strength at the joint permits increasing the allowable span and lowering the allowable pitch.

Considerably more pressure is required to apply the connector plate to the structure than can be readily exerted by a man with a hammer. Consequently, heretofore the assemblyman would lay out a structure such as a truss on the worktable and place a connector plate over each joint. These plates were then tacked into position by driving a plurality of nails through nail holes provided in the plate. These nails were required not only to hold the plate in position until it was fully set but were also required to retain the truss members in abutting position until the last step of the fabrication. When all the connector plates were thus applied to one side of the truss, the truss was turned over and the process repeated. The partially constructed truss was then passed through a roller press or the plates were successively placed beneath a hammer press to drive the teeth fully into the wood. This method, however, is arduous, inefficiently time consuming and expensive.

The invention disclosed in my aforementioned copending application provided a method and apparatus for the quick and inexpensive fabrication of wooden structures with connector plates, without initially tacking the plate in position with nails and without inverting the structure.

It is an object of the present invention to provide an apparatus for the fabrication of wooden structures which is an improvement over the apparatus disclosed by my aforementioned application.

It is another object of the present invention to provide an appaartus as above, in which the components of successive wooden structures are firmly and rigidly held together during the application of the connector plate, irrespective of the slight dimensional variation which may occur between the components of the successive structures.

It is a further object of the present invention to provide an apparatus, as above, whereby the components can be simultaneously locked together for fabrication and simultaneously released to prevent shifting of the components which often occurs when they are sequentially locked together and to permit facile removal of the joined structure without binding.

It is a further object of the present invention to provide an apparatus, as above, from which the joined structure is readily released and removed.

It is a still further object of the present invention to provide an apparatus, as above, having a vertically adjustable gantry press.

These and other objects which will become apparent from the following specification are accomplished by means hereinafter described and claimed.

One preferred embodiment of the present invention is shown by way of example in the accompanying drawings and described in detail without attempting to show all of the various forms and modifications in which the invention might be embodied; the invention being measured by the appended claims and not by the details of the specification.

In the drawings:

FIG. 1 is a schematic perspective view of an improved apparatus according to the present invention adapted for fabricating wooden trusses;

FIG. 2 is a partial top plan taken substantially on line 2—2 of FIG. 1;

FIG. 3 is a section taken substantially on line 3—3 of FIG. 1, showing an individual supporting station as used in the subject apparatus in elevation;

FIG. 6 is a section taken substantially on line 6—6 of FIG. 5;

FIG. 7 is a further section taken substantially on line 7—7 of FIG. 6;

Figure 4:
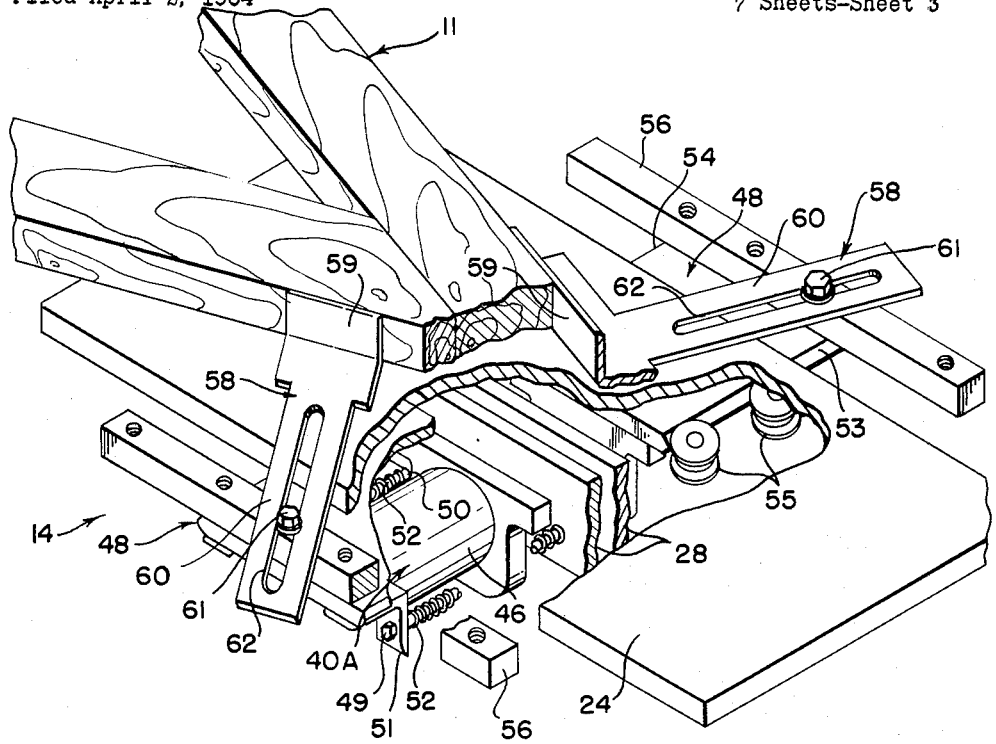
FIG. 4 is an enlarged portion of FIG. 1, also in perspective, and partially cut away, showing the clamping means by which the components of the wooden structure are clamped together preparatory to fabrication.

In general, a fabricating machine according to the present invention comprises a plurality of longitudinally spaced, laterally extending supporting stations aligned with the gantry roller press movable along and above the spaced series of supporting stations. Each joint of the truss structure must rest upon a reaction pad which is sufficiently strong to withstand the pressures applied by the gantry roller against the structural members and connector plates to set the teeth of the connector plates as the gantry roller moves along and above the supporting stations.

In order to accommodate assemblies of various sizes and configurations, the supporting stations are preferably movable toward and away from each other.

Moreover, the use of a plurality of supporting stations provides a work bay adjacent each station which permits the assemblyman to lay out the components of the structure on and across the series of spaced supporting stations. In doing so, the assemblyman also properly positions the connector plates on both sides of, or between, the structural members of the joints. Particular clamping means are provided at selective locations to assure uniformity of assembly and to maintain the components of the structure in position until the teeth of the connector plate have been set by the gantry press.

The clamping means are adapted to maintain the structural members properly together by means of shoe means actuated by cylinders attached to an anchor means on the supporting stations.

After the structural components have been preliminarily assembled, the gantry press, carried on track means, is passed across the structures so that the roller of the gantry press applies pressure downwardly against the components supported on the reaction pads of the supporting stations to drive the teeth of the connector plates into the assembled wooden members. Depending upon the particular size, shape and configuration of the teeth used, they will either be driven completely, or at least far enough into the wood, to hold the structural members together, i.e., the teeth are either completely or initially set. When the teeth are only initially set they are fully seated by passing the structure through a final roller or stamping press.

If desired, additional supporting stations in addition to the number required to assemble a single structure, can be aligned with the gantry press to assemble one or more additional structures. Morevor, it is possible, depending upon the shape of the structure being fabricated, to interfit them, at least partially, across common supporting stations.

In the drawings the fabricating machine according to the present invention is indicated generally by the numeral 10. A truss 11 is depicted in assembly position and is of such size and configuration as to require six supporting stations—a central supporting station 12, two intermediate supporting stations 13 and 14 and an end station 15 on each side of the central station 12.

All the supporting stations are aligned with the gantry press 16 and spaced apart from each other to provide work bays 17 therebetween and to support the truss at all joints.

Each supporting station, whether central, intermediate or end, is constructed generally in the fashion of a bench, suitably braced and trussed to maintain the upper spanning members 18 and 19, supported between the ends 20 and 21 of the supporting station in substantially horizontal disposition, even under load. The spanning members 18 and 19 are preferably spaced apart, parallel channels with opposing outwardly directed legs, or flanges, 22.

Figure 5:
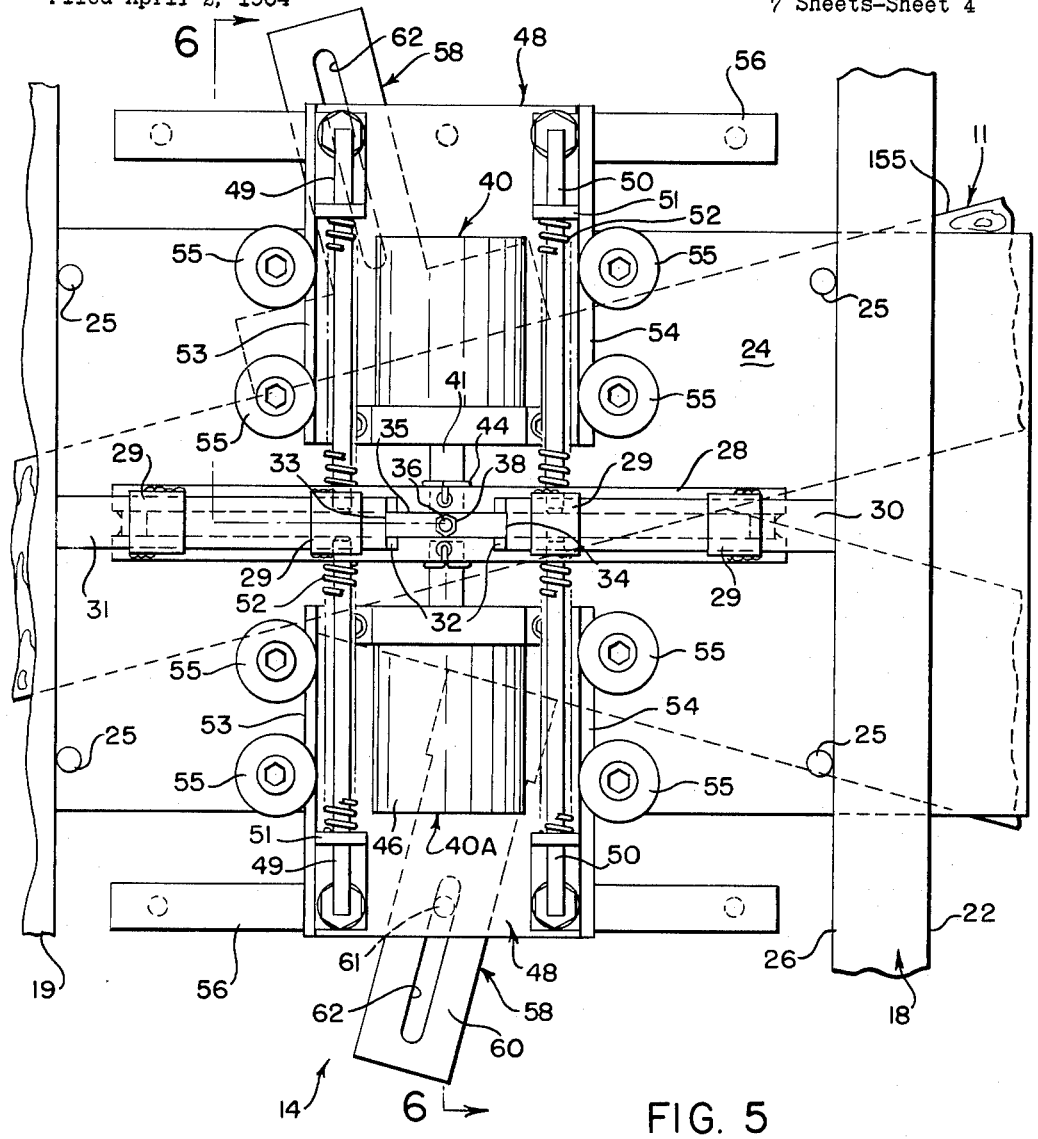
FIG. 5 is an enlarged bottom plan showing that portion of the apparatus depicted in FIG. 4.
Figure 8:
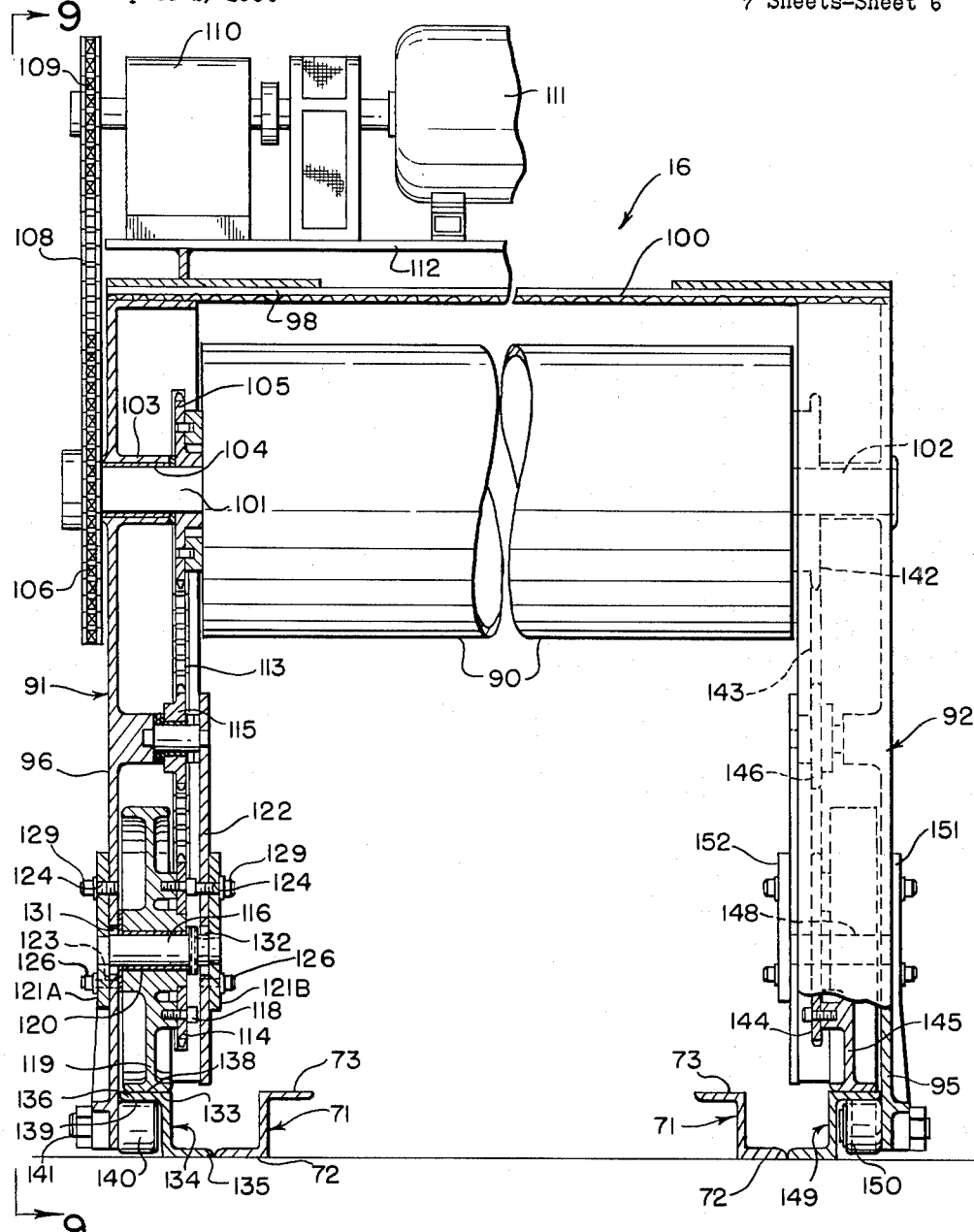
FIG. 8 is a frontal elevation partly broken away, of a gantry press.
Figure 9:
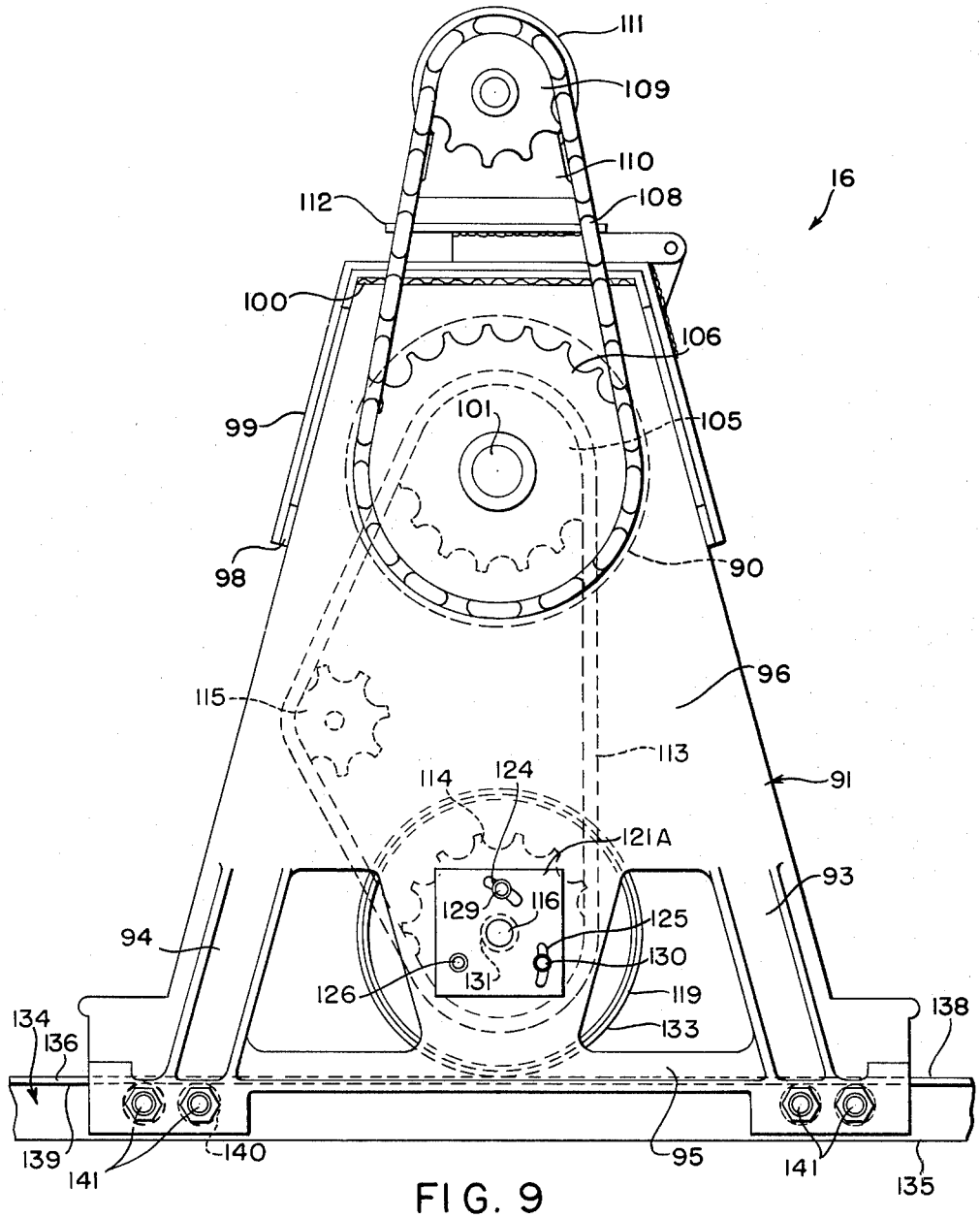
FIG. 9 is a side elevation, partly broken away, taken substantially on line 9—9 of FIG. 8.

One or more rigid, preferably metallic, reaction pads 24 are carried on and between the uppermost portion of the spanning members 18 and 19. While the reaction pad may extend the full dimension of the spanning members, such is not necessary, as it has been found sufficient to use a pad 24 slightly larger than the joined area—i.e., the connector plate area—of the trusses to be fabricated. Adjustable positioning of these efficiently sized reaction pads 24 can be accomplished by the utilization of keeper pins 25 extending downwardly from the underside of the reaction pad which slidably engage the webs 26 of the channel spanning members 18 and 19 in order to maintain the proper lateral position of the reaction pads with respect to the spanning members. See FIGS. 5-7.

Medially of the reaction pad 24 and extending transversely between the spanning members 18 and 19 is an anchor block 28 on the underside of which depend at least two U-shaped guides 29. A pair of opposed and aligned lock bars 30 and 31 are slidably received in the guides 29 so as to be movable away from each other into engagement with the web of the respective spanning members 18 and 19. The facing ends of the lock bars 30 and 31 each have a beveled surface 32 which engages the correspondingly mating beveled surfaces 33 and 34 on a trapezoidal lock block 35. The lock block 35 is vertically bored to receive the mounting bolt 36 and is movable upwardly by the tightening nut 38 to engage the beveled surfaces 33 and 34 on the lock block 35 with the beveled end surface 32 on each of the lock bars 30 and 31, respectively. Thus, upward movement of the lock block 35 forces the lock bars 30 and 31 into frictionally locking engagement with the spanning members 18 and 19 to secure the position of the reaction pad 35.

The clamping means by which the individual structural members are held in place is also mounted on the reaction pad. The actuating portion of the clamping means comprises, preferably identical, opposed cylinder means identified generally by the numerals 40 and 40A, each of which are attached to the anchor plate 28 by a piston rod 41 which is insertably received within an individual receptacle bore 42 in the anchor plate 28 and retained therein by a pin 43 which extends through a bore in the anchor plate transversely of the rod 41, engages, or passes through, the rod 41 and is itself retained by a spring clip 44. Piston 45, fixed to the opposite end of rod 41 mounts a cylinder 46 reciprocably slidable thereon. Along one side of each cylinder is secured a tracking plate 48.

Paralleling each cylinder are a pair of rod-like spring guides 49 and 50. One end of each spring guide is fixed to the anchor plate and the other end is slidably received through a reaction bracket, or abutting tab, 51, attached to and extending downwardly from the tracking plate 48. A spiral compression spring 52 circles each spring guide 49 and 50 and extends between the anchor plate 28 and the reaction bracket 51 in order biasingly to urge the cylinders outwardly away from the anchor plate 28.

Linear motion of the cylinders is assured by the use of the tracking plate 48. The parallel sides 53 and 54 of each tracking plate are formed with a knife edge slidably received in a plurality of V notch wheels 55 rotatably mounted beneath the reaction pad 24.

A mounting, or draw, bar 56, positioned generally transversely of each cylinder 40 and 40A is carried on the tracking plate 48 outwardly and in non-interfering relationship with the reaction pad 24. An engaging shoe 58 having a contact head 59 on the end of the swing arm 60 is attached to the mounting bar by a fastening means, such as a cap screw 61. In order to provide the selectively variable positioning of the shoe 58 with respect to the reaction pad 24, the swing arm 60 has an elongate slot 62 and the mounting bar 56 is preferably provided with a plurality of threaded receivers into which the cap screw 61 can be tightened.

Thus, when the opposed shoes 58 are propitiously disposed for engagement with the members to be joined, fluid pressure is supplied, through conduit 63, into the work chamber 64 to force the cylinders 40 and 40A inwardly toward the anchor plate 28. This forces the opposed shoes toward each other and lockingly engages the structural members therebetween. Upon release of the fluid pressure the spiral compression springs 52 move the cylinders 40 outwardly away from the anchor plate 28, releasing the structural members.

The opposed cylinder clamping means may, with facility, be utilized in a series of locations, particularly at the joints, to hold the structure together while the connector plates are set.

In FIG. 1, wherein a roof truss is depicted, the opposed cylinder arrangement is depicted at the quarter point 65 on the upper chord member. At the heel joint 66, the mid span point 68 of the lower chord member and the quarter point 69 of the lower chord member, a single movable shoe means may be used, if desired, in opposition to a fixed shoe means along the outer edge of the lower chord member without sufficiently binding the truss to prevent its removal. When manufacturing a truss it is also permissible to utilize movable shoe means at the apex 70 which are opposed solely by the configuration of the structural members themselves.

In order to assure maintenance of the supporting stations at a predetermined separation spacing with respect to each other, an anchor track means 71 is provided. The anchor track means is shown as being a structural Z-bar placed along the base of the aligned ends 20 and 21 of the plurality of supporting stations. The one flange 72 is secured to the floor and the second flange 73 extends beneath and partially supports the lowermost portion of the ends 20 and 21.

A pair of wheels 74 are also journaled in the lowermost portion of each end 20 and 21 which permits the position of the supporting stations to be more readily adjusted along the anchor track. When they are placed in their desired location, a bolt 75, or other locking means, mounted on the station may frictionally engage the upper flange 73 of the anchor track 71.

With the supporting stations at least fixed with respect to each other, it should be understood that the placement of the reaction pads 24 and the clamping means will assure uniformity of the structures fabricated thereon.

The gantry press 16 mounts a press roller 90 between two dollies 91 and 92. Dollies 91 and 92 have a modified A frame appearance. Each dolly has upwardly convergent side members 93 and 94 with a base brace 95 between the lower extremities of the side members 93 and 94 and an outer side plate 96 affixed across and adjoined to the side members and base brace.

The two dollies 91 and 92 are rigidly interconnected by transverse bracing, such as by the plurality of angle irons 98 (FIG. 1) which may themselves be further interconnected by struts 99 and then serve as a frame for the mounting of a mesh screen 100 to enclose the roller 90 on the top, front and rear.

A stub shaft 101 extends axially outwardly from one end of the roller 90 and a stub shaft 102 extends axially outwardly from the other end of roller 90. Each shaft is journaled in bearing 103 formed on the upper portion of the side plate 96. A sleeve bushing 104 is preferably interposed between each stub shaft 101 and 102 and its corresponding bearing 103.

The stub shaft 101, which extends toward dolly 91, is nonrotatably keyed to an inner and outer sprocket 105 and 106, respectively.

The outer sprocket 106, i.e., outwardly of the side plate 96, is driven, as by roller chain 108, from a drive sprocket 109 connected through a gear reducer 110 to a power means such as an electric motor 111 which may be carried on an extension of the frame of dolly 91 or any other convenient location, as for example, above the roller 90 on a mount 112 secured to the transverse bracing angle irons 98, as shown.

The inner sprocket 105, i.e., inwardly of the side plate 96, engages a chain 113 which runs to wheel sprocket 114 via a fixed idler sprocket 115.

The wheel sprocket 114 is rotatably mounted on a wheel shaft 116 and fastened, as by a plurality of bolts 118, to a drive wheel 119 also rotatably supported on wheel shaft 116. A flanged sleeve bearing 120 is preferably interposed between the wheel shaft 116 and the joined wheel 119 in sprocket 114.

The height of the roller may be slightly varied and the slack in chain 113 may be controlled by selective positioning of wheel shaft 116. Each end of shaft 116 is received in a shift block 121. The outer of the two shift blocks, indicated as 121A, slidingly engages the axially outer surface of outer side plate 96. The second shift block, indicated as 121B, slidingly engages the axially inner surface of the inner side plate 122. Each of the blocks 121 has a bore 123 and two slots 124 and 125 arcuate about the bore 123 and circumferentially spaced about the juncture point of the shaft 116 and the block 121. A cap screw 126 through bore 123 is tightenable in a threaded receiving bore (not shown) in the outer side plate 96. A similar screw tightens block 121B to plate 122. Two additional cap screws 129 and 130 are receivable in arcuate slots 124 and 125 and similarly tightenably received in side plate 96. Arcuate manipulation of the blocks about its cap screw 126 effects the desired change in position of shaft 116 as it extends through the oversize receiving bores 131 and 132 in plates 96 and 122, respectively.

The radially outer edge, or periphery, 133 of wheel 119, drivingly engages a track 134 fastened to the floor by suitable means not shown. Track 134 assists in providing a vertically restrictive means for preventing the gantry press from lifting off the track as it applies downward pressure to the truss assembled across the supporting stations. Specifically, this may be accomplished by a structural H-bar or a Z-bar track 134. As shown, the lower flange 135 of the Z-bar track 134 is secured to the floor. The upper, oppositely directed, flange 136, is engaged by the drive wheel 119 on the upper surface 138 thereof, and the under surface 139 of the upper flange 136 is engaged by one or more bogie wheels 140 rotatably carried by stub shafts 141 extending perpendicularly inwardly from the outer side plate 96. If desired, a pair of bogie wheels, one on each side of the drive wheel 119, may be placed outwardly of the drive wheel and in alignment therewith to serve as balance wheels and impart stability to the dolly in a direction parallel to its direction of travel.

A dolly 92 may be constructed similarly to dolly 91 except that no motor or power source is associated directly therewith and the stub shaft 102 journaled in dolly 92 in a manner similar to which shaft 101 is journaled in dolly 91 need carry only an inner sprocket 142 nonrotatably secured thereto. A chain 143, similar to chain 113 on dolly 91, drivingly connects sprocket 142 to a sprocket 144 attached to the drive wheel 145 via an intermediate idler sprocket 146. Sprocket 144 and wheel 145 are rotatably mounted on a shaft 148 for driving engagement with the wheel 145 with its track means 149 similar to the engagement of wheel 119 to track 134. Balancing bogie wheels 150 are also provided on dolly 92, and the shaft 148 is vertically variably positionable by shift plates 151 and 152 in the same manner as shaft 116.

In constructing a fabricated truss with exterior connector plates by a machine constructed in accordance with the concept of the present invention, the connector plates are placed teeth up on the appropriate predetermined location on each reaction pad 24. The upper and lower chord members 155 and 156, together with the vertical and diagonal bracing members 158 and 159, respectively, are arranged within the jig formed by the clamping means on the various reaction pads 24. A means, not shown, for pumping pressure fluid into the various cylinder means 40 through conduits, such as 63 is actuated and the shoe means 58 lock the structural components, or members, into position. If each connector plate 160 has been properly placed, all the truss joints will be spanned by an appropriate connector plate on the under side of the assembly of truss members and similarly arranged connector plates 161 can be placed teeth down on the upper side of the assembly.

Thereafter, the operator actuates the motor 111 which drives the wheels 119 and 145 to move the gantry 16 longitudinally along tracks 134 and 149 toward the aligned supporting stations with the components of truss 11 placed thereon. Because the rotation of the press roller 90 is in the same direction as that of the drive wheels 119 and 145 and further because of the preferably large diameter of the roller 90, it progressively contacts and seats the plates as it rolls on top of the assembled truss components. After the teeth of the successive connector plates have thus been set by the passage of the gantry press 16 across the entire truss 11, the clamping means are released.

The truss is then removed from the supporting stations. To facilitate this removal one or more ejector means are provided. The ejector means, indicated generally by the numeral 165, may be mounted on the intermediate supporting stations 13. The ejector means comprises a lift bar 166 oriented parallel to and on one side of the support station 13. A plurality of roller means 168 are mounted on the bar 166 to rotate freely on an axis transversely to that of the bar 166, as on shafts 169. A pair of links 170 and 171 each have one end pivotally attached to bar 166, as at 172 and 173, respectively. The other end of link 170 is pivotally attached, as at 174, to a mounting bracket 175 which is dependingly secured to the spanning member 19 of station 13. Link 171 is also pivotally attached, as at 176, to a similar bracket 178 dependingly secured to the spanning member 19.

An actuating means, such as the cylinder means 179, is connected to at least one of the links. In the embodiment shown the link 171 has an extension 171A which is pivotally attached to the cylinder 180. The piston 181 slidably received in cylinder 180 is attached to a piston rod 182, the other end of which is secured to a base mounting bracket 183 carried on the kingpost 184 of the support station bracing. Admission of pressure fluid to conduit 185 into the work chamber 186 between the piston 181 and cylinder 180 moves the cylinder toward the base bracket 183 to swing the links 170 and 171 and raise the lift bar 166 above the level of the support station. With the links 170 and 171 mounted in parallel disposition and with the pivoting radius, i.e., the distance between their pivotal connection to the support station (174 and 176, respectively) and their connection to the link bar (172 and 173, respectively)—being equal the lift bar will translate upwardly and rearwardly and at all times maintain an orientation parallel to its quiescent position, i.e., parallel to the top of station 13. By varying either the relative orientation of the links and/or their pivoting radii various upward motions can be imparted to the lift bar 166 so that it may not only raise the fabricated structure but tilt it as well, if desired.

In constructing a fabricated truss with "sandwich" connector plates, the assemblyman would first position those structural components of the truss lying in one plane and then place the "sandwich" plates at the joint location before positioning the remaining structural components which lie in an adjacent plane. Thereafter, the operation would be identical to that described above.

It should thus be apparent that according to the concept of the present invention, a truss can be fabricated quickly and inexpensively by the use of connector plates applied simultaneously on both sides of the joints as the gantry press moves across the truss without preliminary tacking.

What is claimed is:

1. In a fabricating machine having a gantry press and one or more supporting stations for setting the teeth of a connector means in the form of one or more connector plates into the structural members of a wooden structure, a clamping means, said clamping means comprising, opposed individual shoe means for engaging said structural members, anchor means on said supporting station, a pair of opposed cylinder means carried on said anchor means, at least one of said cylinders having a mounting bar positioned generally transversely of said cylinder, a plurality of receivers in said mounting bar, each shoe means having a contact head and a swing bar supporting said contact head, said swing bar having an elongate slot, a fastening means extending through said slot and selectively tightenable in said receivers to lock said shoe means in selectively variable positions with respect to said mounting bar, means for supplying pressure fluid to said cylinder means to move the contact head on said shoe means into engagement with the structural members.

2. In a fabricating machine for setting the teeth of a connector means in the form of one or more connector plates into the structural members of a wooden structure comprising, at least one supporting station and a gantry press, at least one reaction pad on said supporting stations upon which the joint between the structural members can repose, opposed shoe means for engaging said structural members at selected intervals, anchor means on said supporting station, a pair of opposed cylinder means carried on said anchor means, each of said opposed cylinder means operatively connected to move one of said shoe means into and out of engagement with said structural members, means for supplying pressure fluid to said cylinder means, a roller means on said gantry press, means to move said roller means across and above said reaction pads, means to restrain vertical movement of said roller means to apply pressure on the joints between said reaction pad and said roller means sufficient to set the teeth of said connector means in said structural members.

3. In a fabricating machine of the type set forth in claim 2, an ejector means, said ejector means comprising, a first and second link rod, one end of each said link rod pivotally attached to said supporting station, a lift bar, the other end of each said link rod pivotally attached to said lift bar, and actuating means connected to at least one of said link rods to pivot said link rod.

4. In a fabricating machine of the type set forth in claim 2, an ejector means, said ejector means comprising, a first and second link rod, one end of each said link rod pivotally attached to said supporting station, a lift bar, said lift bar being positioned generally parallel to said supporting station and normally below but movable above the level of said reaction pad, a plurality of rollers mounted transversely of said lift bar, the other end of each said link rod pivotally attached to said lift bar, a pivotal connection of said link rods to said support station and said lift bar being such that said link rods are parallel, and actuating means connected to at least one of said link rods to pivot said link rod.

5. In a fabricating machine for setting the teeth of a connector means in the form of one or more connector plates into the structural members of a wooden structure comprising, at least one supporting station and a gantry press, at least one reaction pad on said supporting station upon which the joint between the structural members can repose, U-shaped guide means depending beneath said reaction pad, a pair of opposed lock bars slidably received in said U-shaped guides, a lock block between said lock bars selectively to move said lock bars into locking frictional engagement with said supporting station.

6. In a fabricating machine for setting the teeth of a connector means in the form of one or more connector plates into the structural members of a wooden structure comprising, at least one supporting station and a gantry press, at least one reaction pad on said supporting station upon which the joint between the structural members can repose, U-shaped guide means depending beneath said reaction pad, a pair of opposed and aligned lock bars having facing beveled ends, a trapezoidal lock block having beveled sides for matingly engaging the ends of said lock bars, and tightening means to move the beveled surfaces on said lock block into engagement with the beveled ends of said lock bars to drive said lock bars into locking frictional engagement with said supporting station.

7. In a fabricating machine for setting the teeth of a connector means in the form of one or more connector plates into the structural members of a wooden structure comprising, at least one supporting station and a gantry press, at least one reaction pad on said supporting station upon which the joint between the structural members can repose, a track means extending past said supporting station for guidingly supporting said gantry press, a roller on said gantry press, wheel means on said gantry press for providing driving and supporting contact with said track means, said wheel means mounted on a shaft supported in shift blocks, said shift blocks attached to said gantry press in vertically shiftable relation, power means to move said gantry press along said track, movement of said gantry press along said track passing said roller across and above the reaction pads on said supporting station, restrictive means to prevent the gantry press from leaving said track while said roller applies pressure on the joints between said reaction pad and said rollers sufficient to set the teeth of said connector means into said structural members.

8. In a fabricating machine of the type set forth in claim 7, a gantry press having two spaced apart rigidly interconnected dollies with wheel means on each said dolly, shift blocks for each dolly, each said shift block having a bore and two slots arcuate about said bore, said bore and said slots being circumferentially spaced about the mounting of said wheel shaft in said shift block, tightening means connecting said shift blocks to said dollies through said bore and said slots, arcuate manipulation of said shift blocks about the tightening means through said bore effecting a vertical adjustment of said gantry press.

References Cited by the Examiner

UNITED STATES PATENTS

| 254,741 | 3/1882 | Walsh | 269—25 X |
| 2,444,304 | 6/1948 | Miller | 269—25 |
| 3,100,301 | 8/1963 | Black | 227—152 X |

GRANVILLE Y. CUSTER, Jr., *Primary Examiner.*